United States Patent [19]
Hartlepp

[11] Patent Number: 5,190,162
[45] Date of Patent: Mar. 2, 1993

[54] SORTING MACHINE

[76] Inventor: Karl Hartlepp, 487, Highway 53 West, R.R. #1, Ancaster, Ontario, Canada, L9G 3K9

[21] Appl. No.: 737,869

[22] Filed: Jul. 30, 1991

[30] Foreign Application Priority Data

Jul. 30, 1990 [CA] Canada .................... 2022289

[51] Int. Cl.⁵ .................................. B07C 5/00
[52] U.S. Cl. ........................... 209/583; 209/360; 209/698
[58] Field of Search ............... 209/583, 698, 539, 934, 209/707; 198/358, 360

[56] References Cited

U.S. PATENT DOCUMENTS

| | | | |
|---|---|---|---|
| 2,813,627 | 11/1957 | Steber ........................ | 209/539 |
| 2,840,237 | 6/1958 | Vander Tuin et al. ......... | 209/583 X |
| 2,937,739 | 5/1960 | Levy ........................... | 209/698 X |
| 3,069,013 | 12/1962 | Neubrech et al. ............. | 209/698 X |
| 3,631,979 | 1/1972 | Sauerlach et al. ............ | 209/583 X |
| 3,955,678 | 5/1976 | Moyer ......................... | 209/583 X |
| 4,509,635 | 4/1985 | Emsley et al. ................ | 209/698 X |
| 4,697,486 | 10/1987 | Vulcano ...................... | 209/583 X |
| 4,804,078 | 2/1989 | Scata .......................... | 198/360 X |
| 4,878,574 | 11/1989 | Ritter .......................... | 209/698 X |

FOREIGN PATENT DOCUMENTS

| | | | |
|---|---|---|---|
| 2443418 | 3/1976 | Fed. Rep. of Germany ...... | 209/583 |
| 0215420 | 9/1987 | Japan ........................... | 198/360 |
| 0189339 | 12/1966 | U.S.S.R. ....................... | 209/583 |
| 2220902 | 1/1990 | United Kingdom ............. | 198/360 |

Primary Examiner—D. Glenn Dayoan
Assistant Examiner—James R. Bidwell
Attorney, Agent, or Firm—Rogers & Scott

[57] ABSTRACT

A machine for sorting packages having individual bar code identifications. The packages are received at an induction station and an induction conveyor moves the packages up to a gate which is driven by an actuator to allow individual packages to pass through the gate at predetermined intervals. The packages are driven by a transport mechanism along a slider bed having trap doors moveable between an elevated position in alignment with the slider bed and a lowered position providing openings in the slider bed for the packages to fall from the slider bed. The transport mechanism includes individual pushers to move over the slider bed spaced from one another by the predetermined interval so that each pusher receives a respective one of the packages from the induction conveyor and pushes that package along the slider bed. Receiving stations are positioned under the trap doors and a control is operable to move the trap doors between the elevated to the lowered position so that the packages drop from the slider bed into the receiving stations according to order lists and the bar codes used by the machine to recognize the packages and match them to the order lists and hence to a destination receiving station.

9 Claims, 4 Drawing Sheets

SORTING MACHINE

BACKGROUND OF THE DISCLOSURE

This invention relates to sorting machines used in systems for selecting packages from different storage bins to make up orders each of which consists of a variety of such packages, and more particularly to a capable of placing the packages in pre-determined receiving stations.

Manufacturers who develop a large variety of small similar products such as watches, must warehouse a supply of products from which orders are filled. The products are conveniently kept in bins with each bin containing a particular type of product. To assemble an order for a distributor, a person must manually pick from the bins the contents of the order and assemble the order for shipment. This is very time consuming and labour intensive.

The present invention recognises that the process can be streamlined significantly by the use of a sorting machine which is pre-programmed with a group of order lists and identifies the product from a bar code and then transports the products to pre-determined receiving stations where the individual orders are built up. This allows a person to pick products from bins to fill a group of orders before feeding them to the sorting machine which assembles the packages in bins in accordance with the various orders. A sorting machine suitable for this process is provided according to the invention.

SUMMARY OF THE INVENTION

In one of its aspects, the invention provides a sorting machine for sorting packages having bar code identification. The machine includes an induction station for receiving packages and has a gate and a bar code reader. Gate actuation means is operable to open and to close the gate for allowing individual packages to pass through the gate at predetermined intervals and an induction conveyor passes through the induction station and under the gate to carry the packages from the induction station spaced by said predetermined intervals. A slider bed has trap doors moveable between an elevated position in alignment with the slider bed and a lowered position providing openings in the slider bed for the packages to fall from the slider bed and a transport mechanism is operable to receive the packages individually from the induction conveyor and to move the packages along the slider bed. The transport mechanism includes individual pushers to move over the slider bed spaced from one another by said predetermined interval so that each pusher receives a respective one of the packages from the induction conveyor and pushes that package along the slider bed. Receiving stations are positioned under the trap doors and a control means is operable to move the trap doors between the elevated to the lowered position so that the packages drop from the slider bed into the receiving stations according to lists and the bar codes used by the machine to recognise the packages and match them to the order lists and hence to a destination receiving station.

BRIEF DESCRIPTION OF THE DRAWINGS

The invention will be better understood with reference to the drawings, in which.

BRIEF DESCRIPTION OF THE PREFERRED EMBODIMENT

Figure 1:
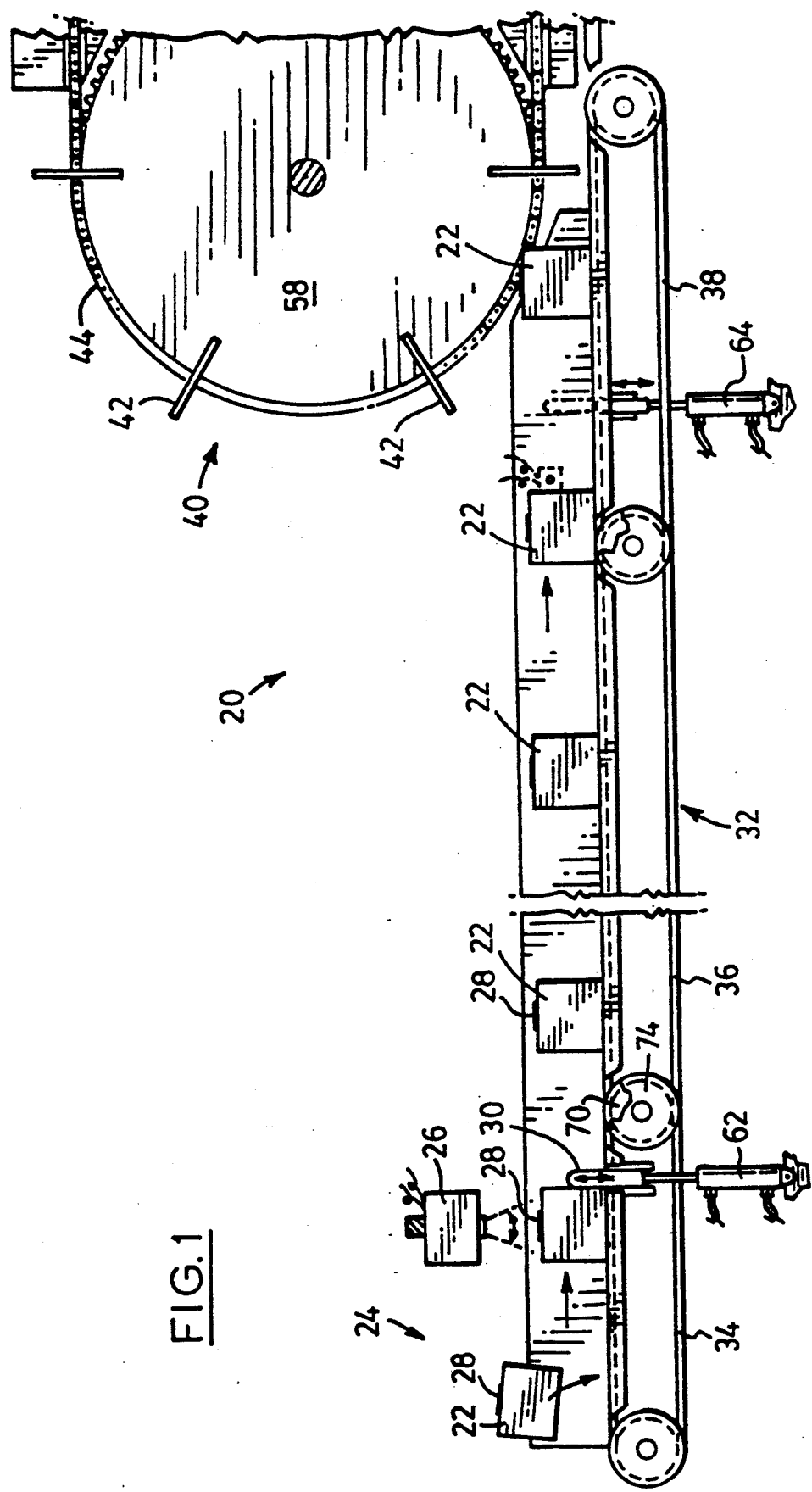
FIG. 1 is a side view of a portion of a sorting according to a preferred embodiment of the invention and illustrating an induction station where packages are fed to the machine.

Reference is made initially to FIG. 1 which illustrates part of the machine 20 receiving packages 22 at an induction station 24 having a bar code reader 26 shown identifying the package from a bar code strip 28. Packages go from the induction station 24 past a gate 30 carried by an induction conveyor 32 which is in three parts, 34, 36, and 38. The last part, 38, carries packages to the transport mechanism 40 which is better seen in FIG. 2.

Figure 2:
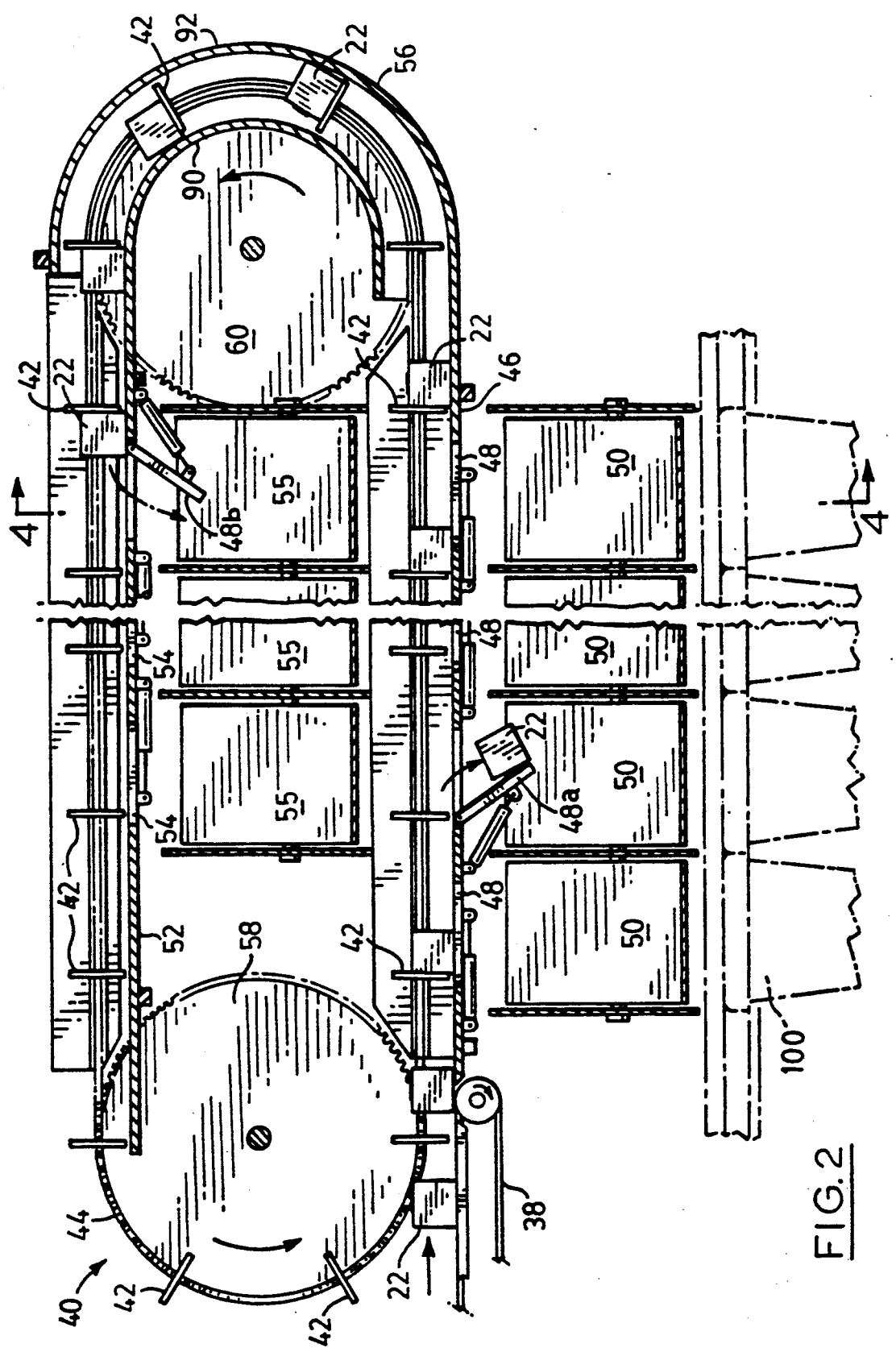
FIG. 2 is a view similar to FIG. 1 and drawn to a slightly smaller scale, and showing a further portion of the machine which receives packages from the portion shown in FIG. 1, this figure illustrating the movement of packages around the machine and into individual receiving stations.

Reference is now made to FIG. 2 which shows packages leaving the conveyor third part 38 for engagement by pushers 42 carried on endless chain 44. The packages are separated by the gate 30 (FIG. 1) to have a predetermined time difference between them matched to the movement of the transport mechanism 40. As a result each package enters the transport mechanism ready to be picked up by a pusher which moves the packages off the conveyor part 38 and onto a slider bed 46. This bed includes a series of trap doors 48 moveable from an elevated position where they are in alignment with the bed 46 to a lowered position where packages will fall past the trap door into receiving stations 50 positioned under the respective trap doors.

The slider bed 46 is in fact a first level and a second level of slider bed 52 is provided above the bed 46 and incorporating further trap doors 54 and receiving stations 55. An elevator 56 is provided between the beds 46 and 52 to guide the packages from the first to the second bed as the pushers carry the packages to the bed 52. All of the packages will have been placed in the respective receiving stations before the pushers again move downwardly carried by a drive wheel 58 which is similar to a drive wheel 60 associated with the elevator 56.

It will be evident from FIGS. 1 and 2 that packages are being sent to receiving stations 50 and 55. Consequently packages can be accumulated in the stations 50 and 55 to build up orders for forwarding to distributors or the like. This is done in accordance with order lists placed in the controls of the machine and the machine recognises products from the bar codes and addresses the products to the destinations where the orders are being built up. At the same time a record is kept of sending the products so that the machine knows when the order is filled. The total number of products fed to the machine matches the numbers the picker accumulates using a list built from the order lists.

Returning to FIG. 1, it will be seen that the gate 30 is associated with an actuator 62 operable to move the gate vertically between a closed position as seen in FIG. 1, and an open position where the gate drops below the level of the conveyor part 34 to allow the conveyor to move the packages to the next part 36. The gate is synchronised with the speed of the conveyor 32 and the transport mechanism 40. As a result the packages 22 are spaced by a predetermined time interval so that each of the pushers 42 meets one package only. Of course there can be spaces between packages should the operator fail to add a new package at the end of the conveyor 32. In this case the spacing between the packages will be a whole number multiple of the predetermined interval.

The conveyor 32 is also provided with a stop mechanism 64 which can be actuated to limit further movement of packages should the packages be spaced with other than the predetermined interval.

Figure 3:
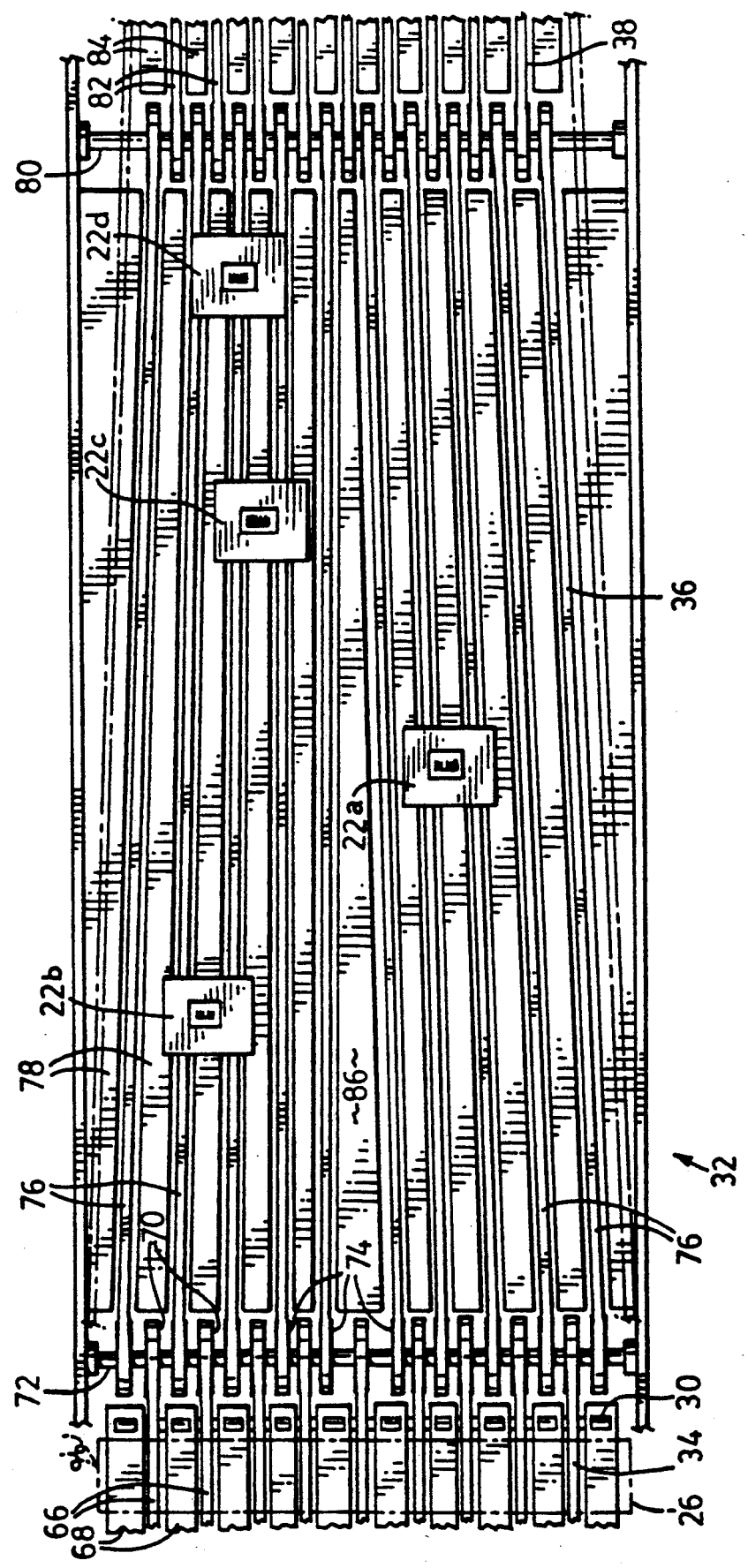
FIG. 3 is a top view of a portion of FIG. 1 and illustrating an induction conveyor.

The induction station and induction conveyor can also be seen in FIG. 3. As seen in this FIG. the parts 34, 36, and 38 of the induction conveyor 32 are arranged to transfer packages from one another as the packages move from the induction station towards the transport mechanism. The packages are carried on a series of belts. Part 34 has belts 66 driven between hardwood slider strips 68 and standing proud of these strips so that there is friction between the belts 66 and the packages sufficient to drive the packages. The belts pass around pulleys 70 on a shaft 72 and this shaft carries further pulleys 74 which drive similar belts 76 between strips 78 on the conveyor part 36. A similar arrangement about a shaft 80 provides drive for these belts and for belts 82 on conveyor part 38 between strips 84.

In the embodiment shown, there are two gates 30, shown one behind the other in. FIG. 1. Similarly there are two actuators 62 and two bar code readers 26. Packages can be added to the induction station from both sides of the conveyor 32 by two operators, one serving each of the bar code readers 26 and gates 30. The synchronisation of the machine is such that the packages are released for movement on the conveyor with a predetermined interval between them and they can come from either one of the gates to travel as shown in FIG. 3. Here it will be seen that a package 22a is travelling from one of the gates whereas package 22b and packages 22c and 22d have travelled from the other of the gates. The paths between the gates are to either side of a centre strip 86 which can be seen to be convergent in the direction of motion. Consequently the packages are made to move towards the centre of the conveyor to minimize the width necessary both at the conveyor part 38 and the transport mechanism as a whole. The spacing between packages in the longitudinal direction of travel along the conveyor 32 is the same between adjacent packages and is related to the aforementioned predetermined interval. Although there is a distance separation shown in FIG. 3 it is best thought of as a time interval in order to time the movement with the rest of the system. Clearly this separation has to be related to the positions of pushers 42 (FIG. 1) on the transport mechanism 40 so that one, and only one, package will enter between adjacent pushers. There can be gaps in the flow of packages in which case the distance between two packages will be a whole number multiple of the interval converted to a distance on the conveyor.

After the packages are picked up by the transport mechanism 40, they move along the slider bed 46 and over the trapdoors 48 until a particular package reaches a trap door which is the destination for that package. A control system for the machine recognises the position of the package and opens the corresponding trap door such as trap doors 48a and 48b shown in FIG. 2. Here it will be seen that trapdoor 48a has opened and the adjacant pusher has brought the package over an opening 88 left by the trapdoor so that the package falls into the corresponding one of the receiver stations 50. The trapdoor 48b has just opened and the package has yet to reach this position but it will obviously fall into the corresponding receiving station 55. The timing is such that the trapdoor can return to the elevated position in alignment with the associated slider bed before the next package arrives.

The elevator 56 includes inner and outer curved portions 90, 92 arranged so that when pushers carry packages from the slider bed 46 to the slider bed 52, the package initially rests on the outer curved portion 92 and eventually transfers under the influence of gravity to the inner curved portion while it continues to be moved by the associated pusher carried on the endless chain 44. (The belt is a chain)

Figure 4:
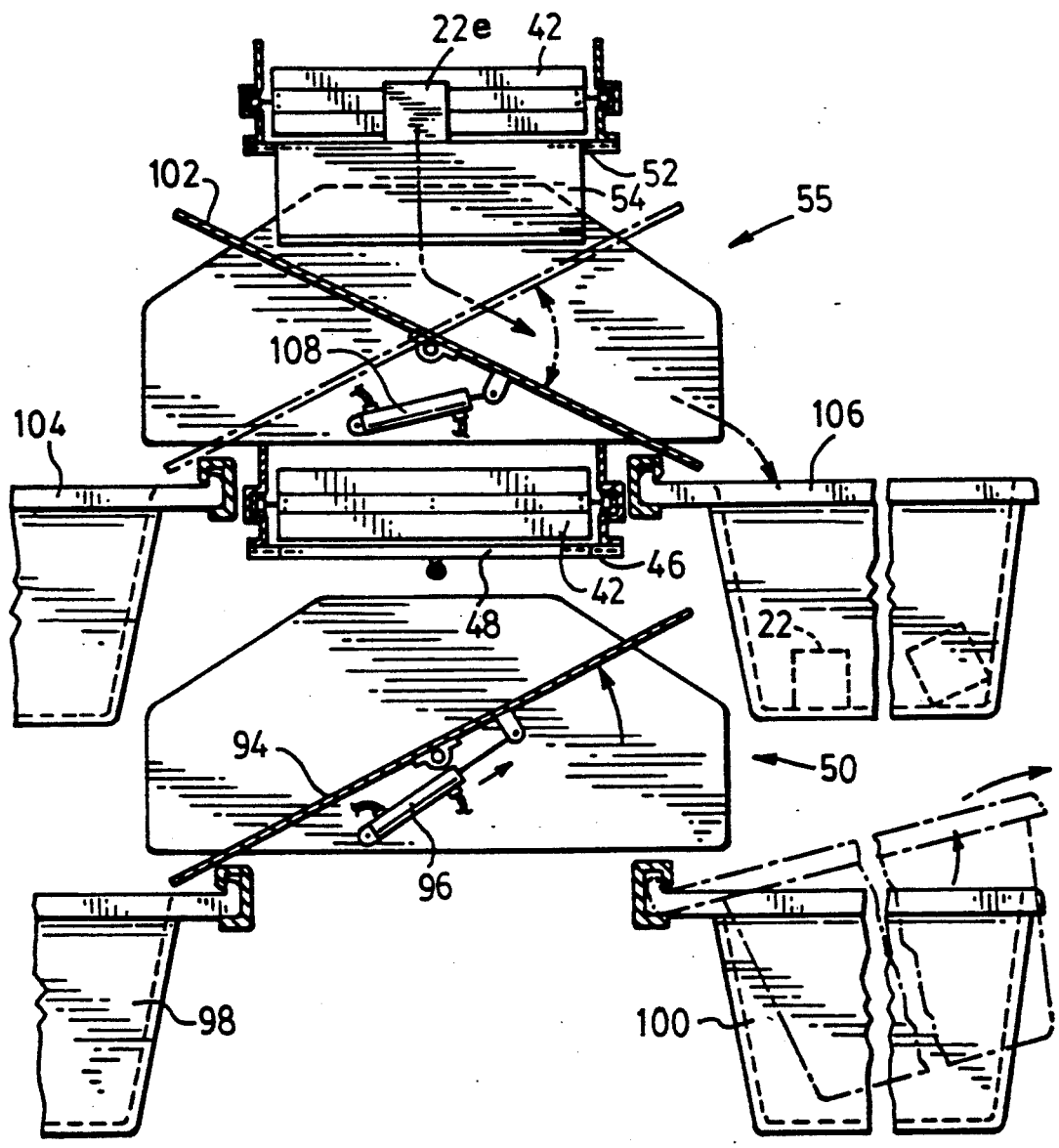
FIG. 4 is a sectional view on line 4—4 of FIG. 2 and illustrating the movement, of packages into receiving stations.

Reference is next made to FIG. 4 which illustrates the sectional view on line 4—4 of FIG. 2. The section is not an entirely true section but illustrates the relationship existing between the slider beds 46, 52 at the respective first and second levels, and receiving stations 50 and 55 associated with these slider beds. Dealing firstly with the slider bed 46, it will be seen that the trap doors 48 is in the elevated position prior to receiving a parcel and that a pusher 42 has just passed over the trap door. Under the trap door is a tilting chute 94 operated by an actuator 96 moveable from a first position as shown where packages would drop onto the chute 94 to slide under the influence of gravity into a receptacle 98 and a second position where the actuator 96 would cause the chute to be tilted towards a further receptacle 100 at the opposite side of the bed 46. This movement of the tilting chute is better illustrated with reference to a similar chute 102 under a trapdoor 54 for dropping a package 22e which is approaching the trapdoor driven by an associated pusher 42.

The tilting chute 102 services receptacles 104, 106 depending upon which position is taken up under the influence of an actuator 108. One position is shown in full outline and the other in ghost outline.

The fact that each of the trapdoors is capable of servicing two receptacles means that the machine can be operated with receptacles on one side of the transport mechanism until those receptacles have complete orders, and then the chutes can be tilted in the other direction to fill orders in the opposite receptacles while the first receptacles are unloaded. This is particularly convenient to ensure that the machine is in full use while operators can move completed orders. Of course it is possible to operate any of the tilted chutes at any time so that some of the receptacles on one side could be serviced with receptacles on the other side.

Although the invention has been described with reference to a specific preferred embodiment, the invention is to be interpreted to include all structures incorporated in the claims.

I claim:

1. A sorting machine for storing packages identified by individual bar codes carried on the packages the machine comprising:
   an induction station for receiving packages and including a gate and a bar code reader;
   gate actuation means operable to open and to close the gate for allowing individual packages to pass through the gate at predetermined intervals;
   an induction conveyor passing through the induction station and passing under the gate to carry the packages from the induction station are permitted by the gate actuation means, the packages being spaced on the induction conveyor by said predetermined intervals;

a slider bed having trap doors moveable between an elevated position in alignment with the slider bed and a lowered position providing openings in the slider bed for the packages to fall from the slider bed;

a transport mechanism operable to receive the packages individually from the induction conveyor and to move the packages along the slider bed, the transport mechanism including individual pushers to move over the slider bed spaced from one another by said predetermined interval so that each pusher receives a respective one of the packages from the induction conveyor and pushes that package along the slider bed;

receiving stations positioned under the trap doors;

control means operable in response to the bar codes on the packages to move the trap doors between the elevated to lowered position so that the packages drop from the slider bed into the receiving stations according to an address list stored in the control means and in response to the identifying bar codes.

2. A machine as claimed in claim 1 in which the transport mechanism includes an endless chain moving the pushers.

3. A machine as claimed in claim 1 in which the slider bed is on first and second levels and in which the transport mechanism includes an elevator to move the packages from the first to the second level.

4. A machine as claimed in claim 3 in which the transport mechanism includes an endless chain carrying the pushers.

5. A machine as claimed in claim 3 in which the elevator includes inner and outer curved sections so that the packages are elevated by the pushers between the curved sections as the packages are moved between the first and second levels of the slider bed.

6. A machine as claimed in claim 1 in which the induction conveyor converges from the induction station toward the transport mechanism.

7. A machine as claimed in claim 1 in which each of the receiving stations include a tilting chute below the associated one of the trap doors and a pair of receptacles, one to each side of the titling chute so that packages can be received selectively in the receptacles.

8. A machine as claimed in claim 7 in which the induction conveyor converges from the induction station towards the transport mechanism.

9. A machine as claimed in claim 1 in which the induction conveyor includes belts running between fixed strips with the belts slightly proud of the strips sufficient to drive the packages along the conveyor.

* * * * *